(12) United States Patent
Ishikawa

(10) Patent No.: US 9,476,442 B2
(45) Date of Patent: Oct. 25, 2016

(54) STRUCTURE FOR MOUNTING ANTI-FOG SHEET TO SHIELD

(75) Inventor: Michihiko Ishikawa, Tokyo (JP)

(73) Assignee: Shoei Co., Ltd., Tokyo (JP)

( * ) Notice: Subject to any disclaimer, the term of this patent is extended or adjusted under 35 U.S.C. 154(b) by 911 days.

(21) Appl. No.: 13/698,520

(22) PCT Filed: Apr. 25, 2011

(86) PCT No.: PCT/JP2011/060061
§ 371 (c)(1),
(2), (4) Date: Feb. 4, 2013

(87) PCT Pub. No.: WO2011/152156
PCT Pub. Date: Dec. 8, 2011

(65) Prior Publication Data
US 2013/0129449 A1 May 23, 2013

(30) Foreign Application Priority Data
Jun. 3, 2010 (JP) .................................. 2010-127951

(51) Int. Cl.
  *F16B 19/00* (2006.01)
  *A42B 3/24* (2006.01)
  *F16B 5/06* (2006.01)
  (Continued)

(52) U.S. Cl.
  CPC ............... *F16B 19/004* (2013.01); *A42B 3/24* (2013.01); *F16B 5/065* (2013.01); *F16B 5/10* (2013.01); *F16B 21/02* (2013.01)

(58) Field of Classification Search
  CPC .......... A42B 3/22; A42B 3/24; A42B 3/221; A42B 3/222; A42B 3/225; A42B 3/227; A42B 3/228; A42B 3/26; A42B 3/18; A42B 3/185; A42B 3/20; A42B 3/226; F16B 19/004; Y10T 24/44026
  USPC ............... 2/422, 424, 425, 6.3, 6.4, 6.5, 6.7; 411/398, 349, 509; 351/155, 47
  See application file for complete search history.

(56) References Cited

U.S. PATENT DOCUMENTS

| | | | |
|---|---|---|---|
| 4,047,249 A * | 9/1977 | Booth ....................... | A42B 3/24 2/10 |
| 4,138,746 A * | 2/1979 | Bergmann ............... | A42B 3/26 2/10 |
| 5,765,235 A | 6/1998 | Arnold | |

(Continued)

FOREIGN PATENT DOCUMENTS

| | | |
|---|---|---|
| EP | 0 953 299 A2 | 11/1999 |
| EP | 1 514 486 A1 | 3/2005 |

(Continued)

OTHER PUBLICATIONS

Supplementary European Search Report dated Jun. 20, 2014 issued in European Patent Application No. 11 78 9565.

*Primary Examiner* — Andrew W Collins
*Assistant Examiner* — Brieanna Szafran
(74) *Attorney, Agent, or Firm* — Arent Fox LLP

(57) ABSTRACT

A retaining member for mounting an anti-fog sheet to a shield. According to some aspects, a main shaft of the retaining member, which is rotatably fitted into a support hole of the shield and has a head portion abuting against an outer face of the shield, has an elastic deformation part so as to absorb a load which comes from both the shield and the anti-fog sheet, and which acts on the retaining member by deforming the elastic deformation part.

6 Claims, 7 Drawing Sheets

(51) Int. Cl.
*F16B 5/10* (2006.01)
*F16B 21/02* (2006.01)

(56) References Cited

U.S. PATENT DOCUMENTS

| | | | |
|---|---|---|---|
| 5,966,738 A * | 10/1999 | Wang Lee | A42B 3/225 2/10 |
| 6,161,225 A | 12/2000 | Arai | |
| 6,922,850 B1 | 8/2005 | Arnold | |
| 2002/0109922 A1 * | 8/2002 | Wilson | A42B 3/26 359/630 |
| 2005/0066427 A1 * | 3/2005 | Gafforio | A42B 3/24 2/422 |
| 2005/0166304 A1 * | 8/2005 | Hughes | A42B 3/26 2/426 |

FOREIGN PATENT DOCUMENTS

| | | |
|---|---|---|
| JP | 11-315412 A | 11/1999 |
| JP | 2003-507594 A | 2/2003 |
| JP | 2005-97823 A | 4/2005 |
| JP | 20006-220180 A | 8/2006 |
| JP | 2011-63929 A | 3/2011 |
| WO | WO 2009/040581 A1 | 4/2009 |

* cited by examiner

STRUCTURE FOR MOUNTING ANTI-FOG SHEET TO SHIELD

TECHNICAL FIELD

The present invention relates to a structure for mounting an anti-fog sheet on an inner face of a shield fitted on a helmet, etc. and, in particular, to an improvement of a structure for mounting an anti-fog sheet to a shield, the structure including a plurality of seat parts that are formed on a peripheral edge part of an anti-fog sheet covering an inner face of a shield, a plurality of support holes that are provided in the shield at positions corresponding to the seat parts, and a plurality of retaining members that retain the anti-fog sheet by being seated on the seat parts while being supported by the support holes.

BACKGROUND ART

Such a structure for mounting an anti-fog sheet to a shield is known, as disclosed in for example Patent Document 1 below.

RELATED ART DOCUMENTS

Patent Documents

Patent Document 1: Japanese Patent Application Laid-open No. 2005-97823

SUMMARY OF THE INVENTION

Problems to be Solved by the Invention

In the structure for mounting an anti-fog sheet to a shield described in Patent Document 1, a retaining member is formed from two components, that is, a first member that is fitted into a support hole of the shield while restraining an inner face of the anti-fog sheet, and a second member that is fitted and linked to the first member while restraining an outer face of the shield.

When the shield having the anti-fog sheet mounted thereto makes contact with another object with an impact, due to some deformation occurring in the shield, relative movement occurs between the shield and the anti-fog sheet, a load due to this is applied to the above-mentioned retaining member, the retaining member is thereby separated into the two components or broken, and the anti-fog sheet cannot be retained in some cases. Furthermore, with regard to the retaining member formed from the two components, the production cost is high, and handling when mounting an anti-fog sheet is cumbersome.

The present invention has been accomplished in light of such circumstances, and it is an object thereof to provide a structure for mounting an anti-fog sheet to a shield in which a retaining member will not break even when a shield receives a load, and the retaining member is formed from a single component, is therefore inexpensive, and is easy to handle.

Means for Solving the Problems

In order to attain the above object, according to a first aspect of the present invention, there is provided a structure for mounting an anti-fog sheet to a shield, the structure comprising a plurality of seat parts that are formed on a peripheral edge part of an anti-fog sheet covering an inner face of a shield, a plurality of support holes that are provided in the shield at positions corresponding to the seat parts, and a plurality of retaining members that retain the anti-fog sheet by being seated on the seat parts while being supported by the support holes, characterized in that the retaining member is formed as a single component from a synthetic resin, the single component comprising a main shaft that has at one end a head portion abutting against an outer face of the shield and is rotatably fitted into the support hole, an eccentric shaft that is connectedly provided eccentrically and integrally with the other end of the main shaft, can be seated on the seat part, and has a smaller diameter than the main shaft has, and an expanded end part that is connectedly provided integrally with an outer end of the eccentric shaft, defines an annular groove around the eccentric shaft in cooperation with the main shaft, and can pass through the support hole, and the main shaft is provided with an elastic deformation part, a load acting on the retaining member from the shield and the anti-fog sheet being absorbed by elastic deformation of the elastic deformation part.

Further, according to a second aspect of the present invention, in addition to the first aspect, the main shaft is provided with a slit that extends through substantially the entire length thereof at a position away from a central axis thereof and opens in the annular groove, and the slit divides the main shaft into a main shaft main portion that is connected to the eccentric shaft and an elastic piece that has a free end and forms the elastic deformation part.

Furthermore, according to a third aspect of the present invention, in addition to the second aspect, an axially intermediate part of the main shaft main portion is formed as a small diameter part that serves as the elastic deformation part by forming a peripheral groove on an outer periphery of the axially intermediate part.

Moreover, according to a fourth aspect of the present invention, in addition to the second aspect, the elastic piece has a latching claw formed on a free end part thereof, the latching claw abutting against the inner face of the shield when the main shaft is fitted into the support hole, thereby preventing the main shaft from coming out of the support hole.

Further, according to a fifth aspect of the present invention, in addition to the fourth aspect, the latching claw has formed on an outer peripheral edge thereof an inclined guide face that slidably engages with an open edge of the support hole when the main shaft is being fitted into the support hole, thereby guiding entry of the latching claw into the support hole while resiliently tilting the elastic piece toward the slit side.

Furthermore, according to a sixth aspect of the present invention, in addition to the first aspect, the head portion is provided with a marker showing the position of eccentricity of the eccentric shaft relative to the main shaft, and the expanded end part has a tool engagement part formed thereon.

Moreover, according to a seventh aspect of the present invention, in addition to the first aspect, the anti-fog sheet has a seal member attached to an outer face thereof, the seal member extending in an endless form along the peripheral edge of the outer face and being in intimate contact with the inner face of the shield, and a sealed gap surrounded by the seal member being defined between the shield and the anti-fog sheet.

Effects of the Invention

In accordance with the first aspect of the present invention, since the retaining member, which is made of a synthetic resin, is formed as a single component from the head part at one end to the expanded end part at the other end, and the anti-fog sheet can be mounted on the shield thereby, a structure for mounting an anti-fog sheet having a simple structure and enabling easy mounting can be provided at low cost.

Moreover, if, during handling of the helmet, the shield deforms due to contact with another object with an impact, thus causing relative movement between the shield and the anti-fog sheet, and the load caused thereby is applied to the retaining member, the above-mentioned load can be absorbed by deformation of the elastic deformation part of the retaining member, thereby preventing the retaining member from being broken. Therefore, the retaining member can reliably retain the anti-fog sheet over a long period of time due to improvement of its durability.

In accordance with the second aspect of the present invention, due to elastic deformation such as flexure or expansion occurring in the elastic piece having the free end part in the main shaft, the load is absorbed effectively, and it is thus possible to prevent the retaining member from being broken. Moreover, the elastic piece can be obtained simply by forming a slit in the main shaft, and the structure is simple.

In accordance with the third aspect of the present invention, in addition to elastic deformation of the elastic piece, due to elastic deformation such as flexure or expansion occurring in the small diameter part in the main shaft, the load can be absorbed more effectively, and it is thus possible to prevent the retaining member from being broken. Moreover, the small diameter part can be obtained simply by forming a peripheral groove on the outer periphery of the axially intermediate part of the main shaft main portion, and the structure is simple.

In accordance with the fourth aspect of the present invention, when the main shaft is fitted into the support hole, the latching claw is latched with the inner face of the shield by utilizing the elasticity of the elastic piece to thus enable the retaining member to be mounted on the shield, subsequent retention of the anti-fog sheet by the retaining member can therefore be carried out easily, and the ease of assembly is very good.

In accordance with the fifth aspect of the present invention, when the retaining member is inserted into the support hole, the latching claw can smoothly enter the support hole by making the taper face of the latching claw slip on the open edge of the support hole, and the ease of assembly can be further improved.

In accordance with the sixth aspect of the present invention, when the retaining member is rotated by a tool that is engaged with the tool engagement part of the expanded end part, it is possible by means of the marker provided on the head part to confirm the position of eccentricity of the eccentric shaft, that is, an unlock position and a lock position with respect to the anti-fog sheet, and the ease of assembly can be yet further improved.

In accordance with the seventh aspect of the present invention, not only is it possible for the sealed gap to become an insulation space to reduce the difference in temperature between the inner face and the outer face of the shield, thereby achieving anti-fogging, but it is also possible to prevent rain drops from becoming attached to opposing faces of the shield and the anti-fog sheet when it is raining, thereby as far as possible preventing any degradation in visibility caused by rain drops.

EXPLANATION OF REFERENCE NUMERALS AND SYMBOLS

Figure 1:
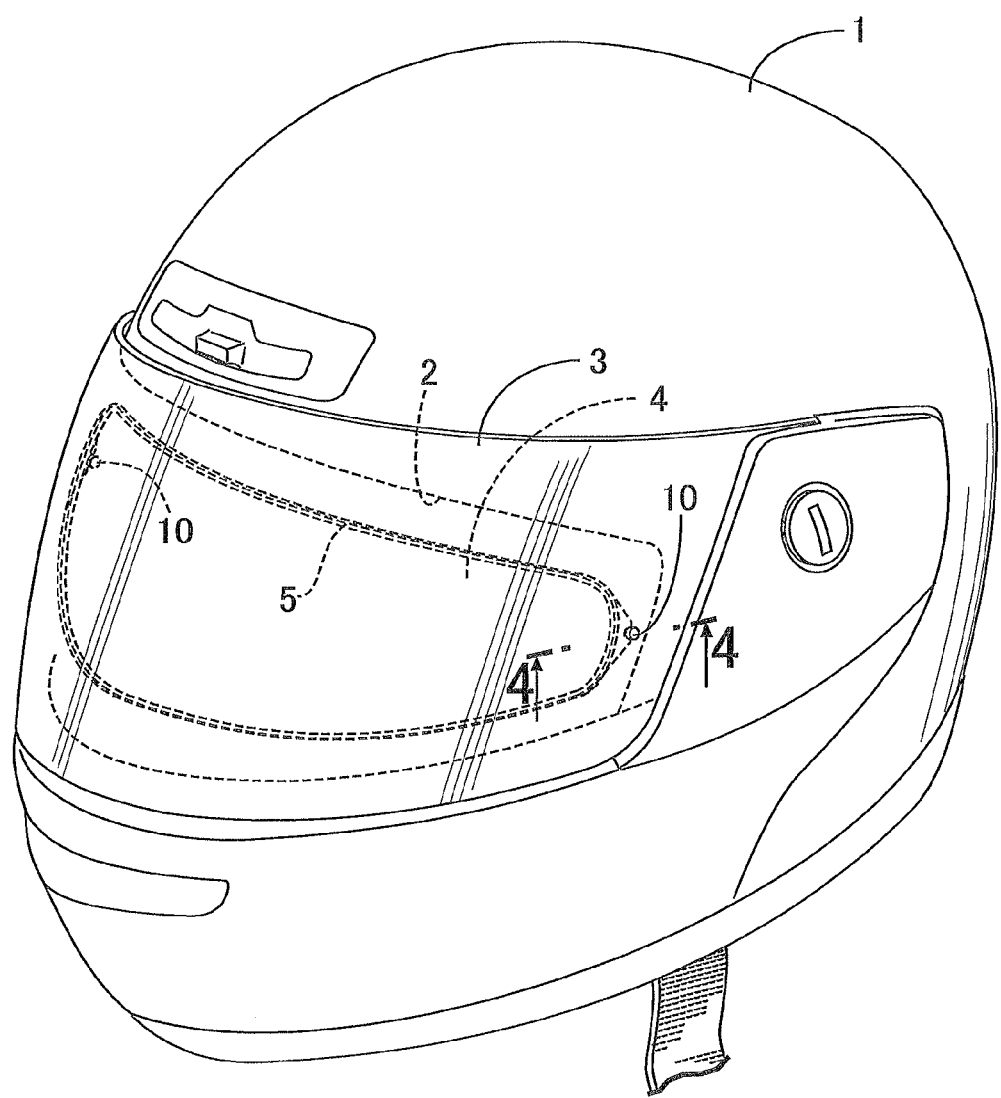
FIG. 1 is a perspective view of a helmet provided with a shield equipped with an anti-fog sheet related to the present invention. (first embodiment)

3 Shield
4 Anti-fog sheet
5 Seal member
7 Seat part
8 Support hole
10 Retaining member
11 Main shaft
11a Head portion
12 Eccentric shaft
13 Expanded end part
14 Annular groove
15 Slit
16 Main shaft main portion
17 Elastic piece
18 Latching claw
18a Inclined guide face
19 Small diameter part
20 Peripheral groove
21 Marker (marker projection)
22 Tool engagement part
23 Sealed gap
24 Tool
e Amount of eccentricity of eccentric shaft relative to main shaft
Y Central axis of main shaft

MODE FOR CARRYING OUT THE INVENTION

A mode for carrying out the present invention is explained below by reference to the attached drawings.

Embodiment 1

Figure 2:
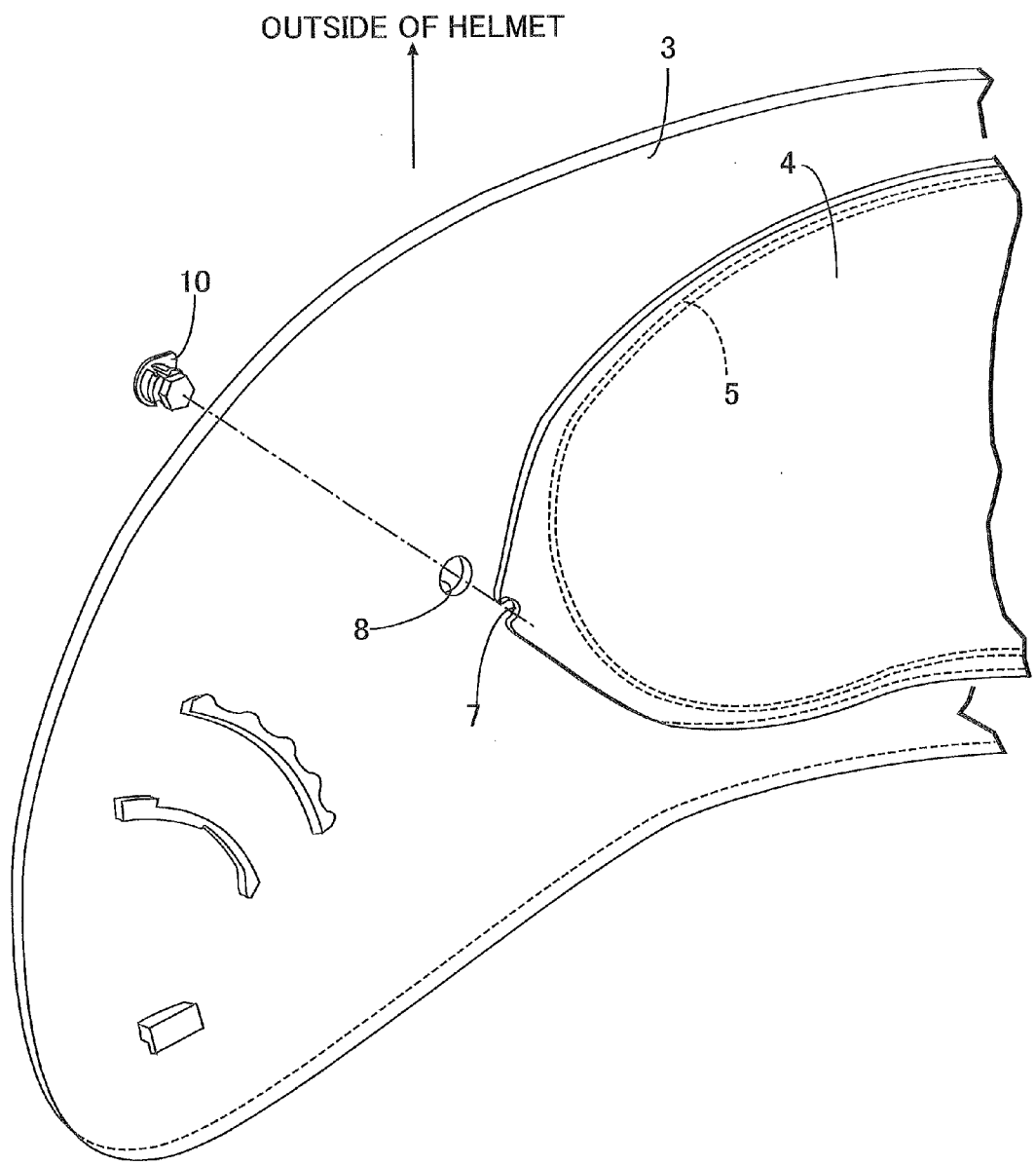
FIG. 2 is an exploded perspective view of the shield, the anti-fog sheet, and a retaining member therefor. (first embodiment)

In FIG. 1 and FIG. 2, a helmet 1 for riding a motorcycle, a buggy, etc. is detachably equipped with a shield 3 for covering its front window 2. This shield 3 is molded from a translucent and hard synthetic resin (e.g. polycarbonate), and an anti-fog sheet 4 is mounted on the shield 3, the anti-fog sheet 4 covering a wide range of the inner face thereof. This anti-fog sheet 4 is molded from a synthetic resin having translucence and hydrophilicity (e.g. cellulose propionate), thus preventing the occurrence of fogging due to exhalation by a user wearing the helmet 1.

With regard to the shield 3 and the anti-fog sheet 4, a laterally central portion is curved so as to protrude forward so that it follows an outer peripheral face of the helmet 1, and a seal member 5 is adhered to an outer face of the anti-fog sheet 4, the seal member 5 extending in an endless form along the peripheral edge of the outer face. Formed on laterally opposite edges of the anti-fog sheet 4 are a pair of U-shaped cutout seat parts 7, and provided in the shield 3 so as to correspond to these seat parts 7 are a pair of support holes 8 (only the seat part 7 and support hole 8 on the left side being shown in FIG. 2). Engaging retaining members 10 supported by these support holes 8 with the seat parts 7 enables the anti-fog sheet 4 to be mounted on the shield 3.

Figure 3:
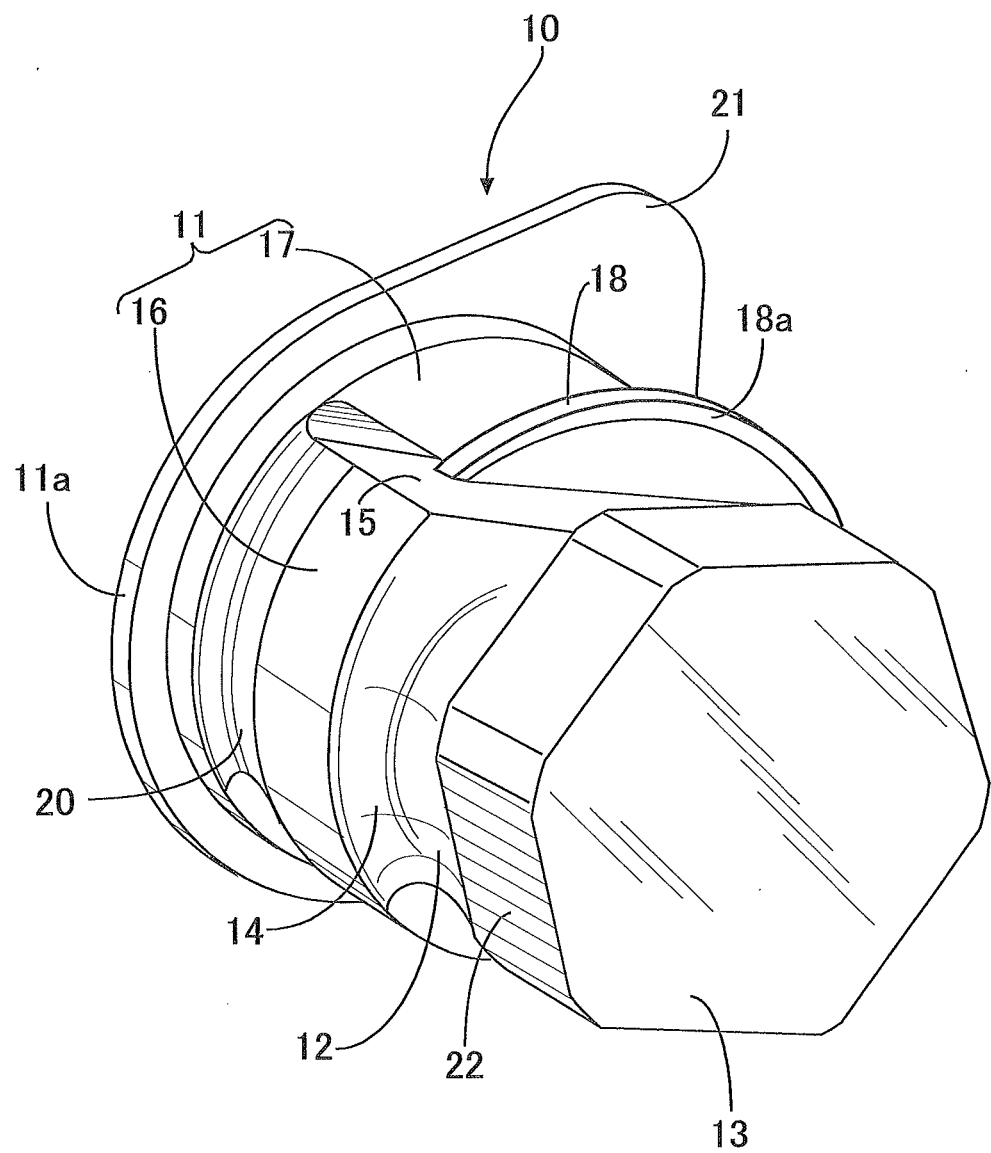
FIG. 3 is an enlarged perspective view of the retaining member. (first embodiment)
Figure 4:
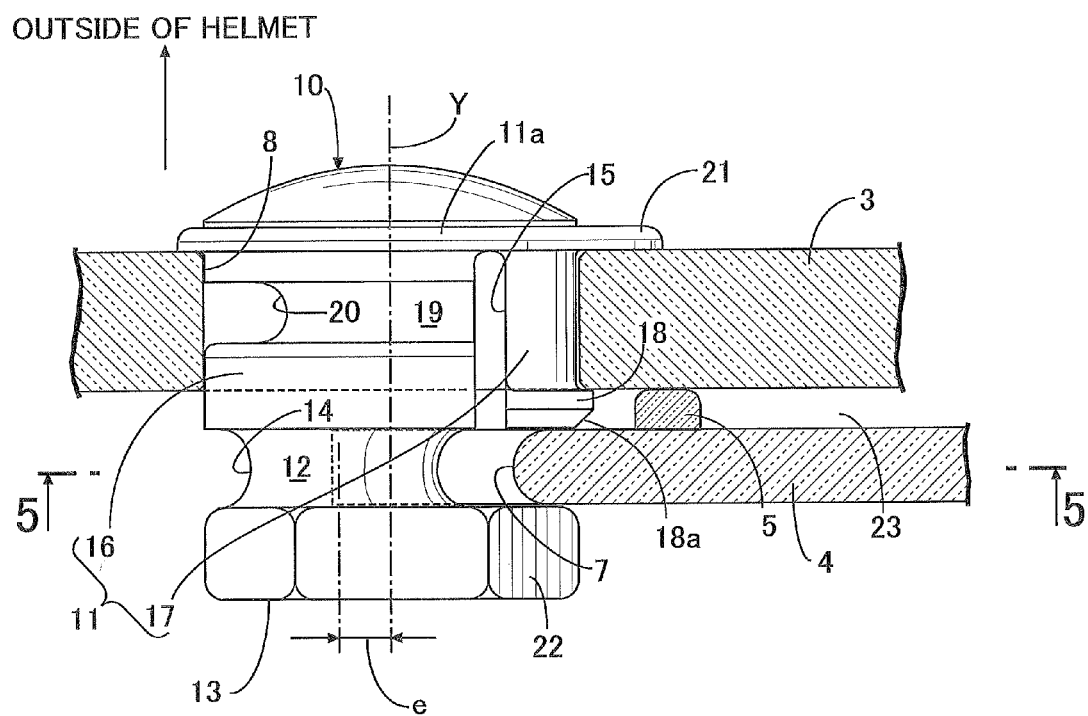
FIG. 4 is an enlarged sectional view along line 4-4 in FIG. 1 (showing an unlock position of an eccentric shaft). (first embodiment)
Figure 5:
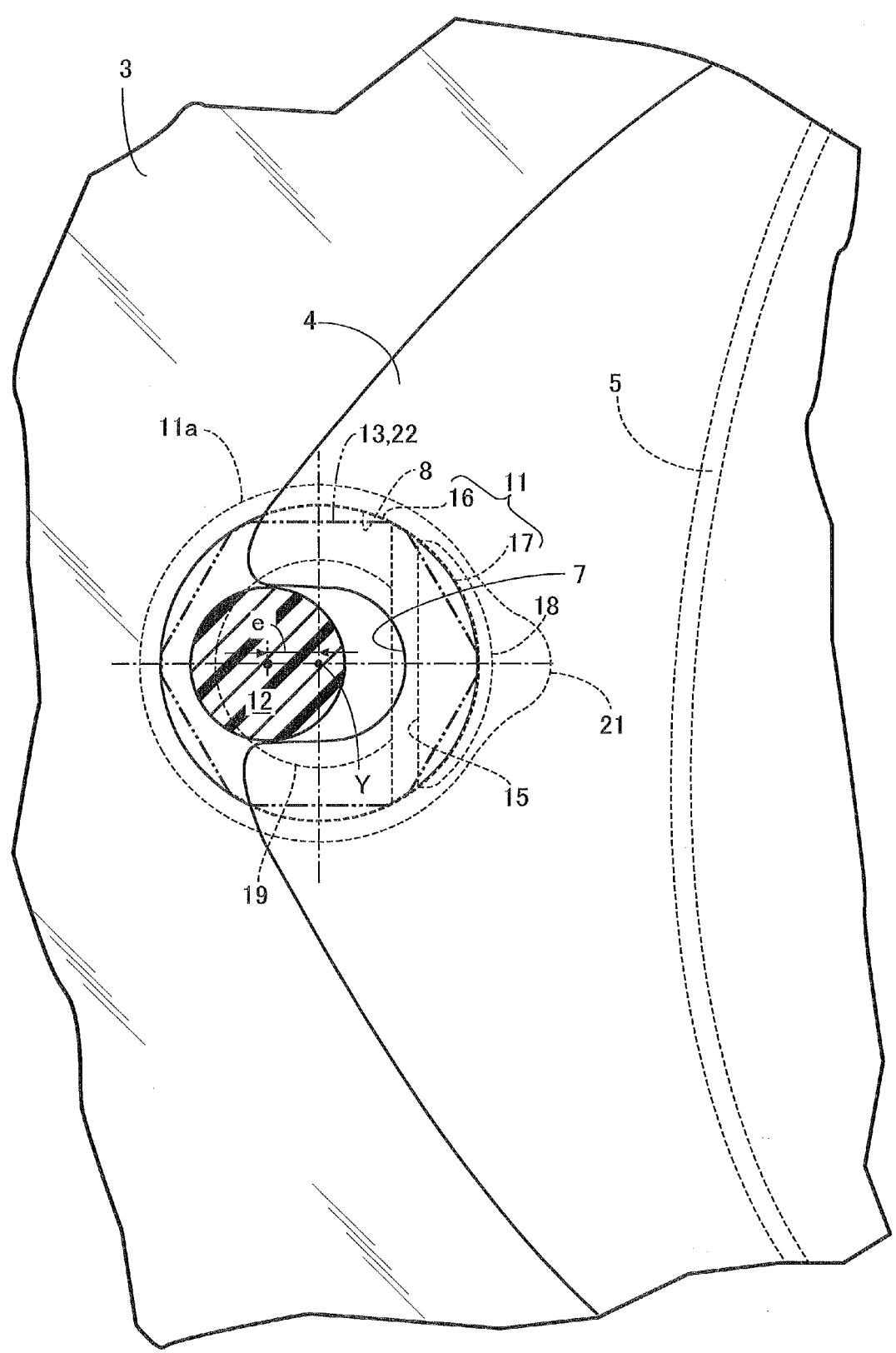
FIG. 5 is a sectional view along line 5-5 in FIG. 4. (first embodiment)
Figure 6:
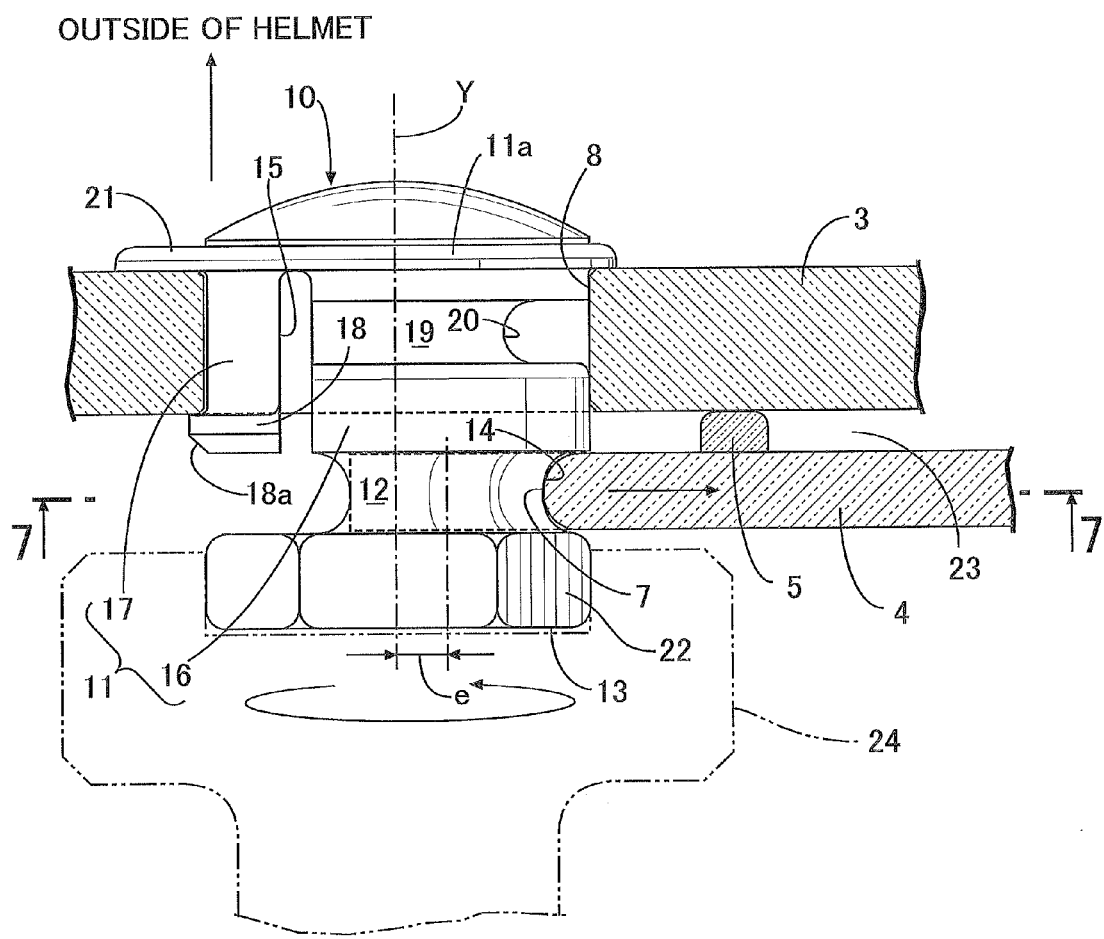
FIG. 6 is an enlarged sectional view along line 4-4 in FIG. 1 (showing a lock position of the eccentric shaft). (first embodiment)
Figure 7:
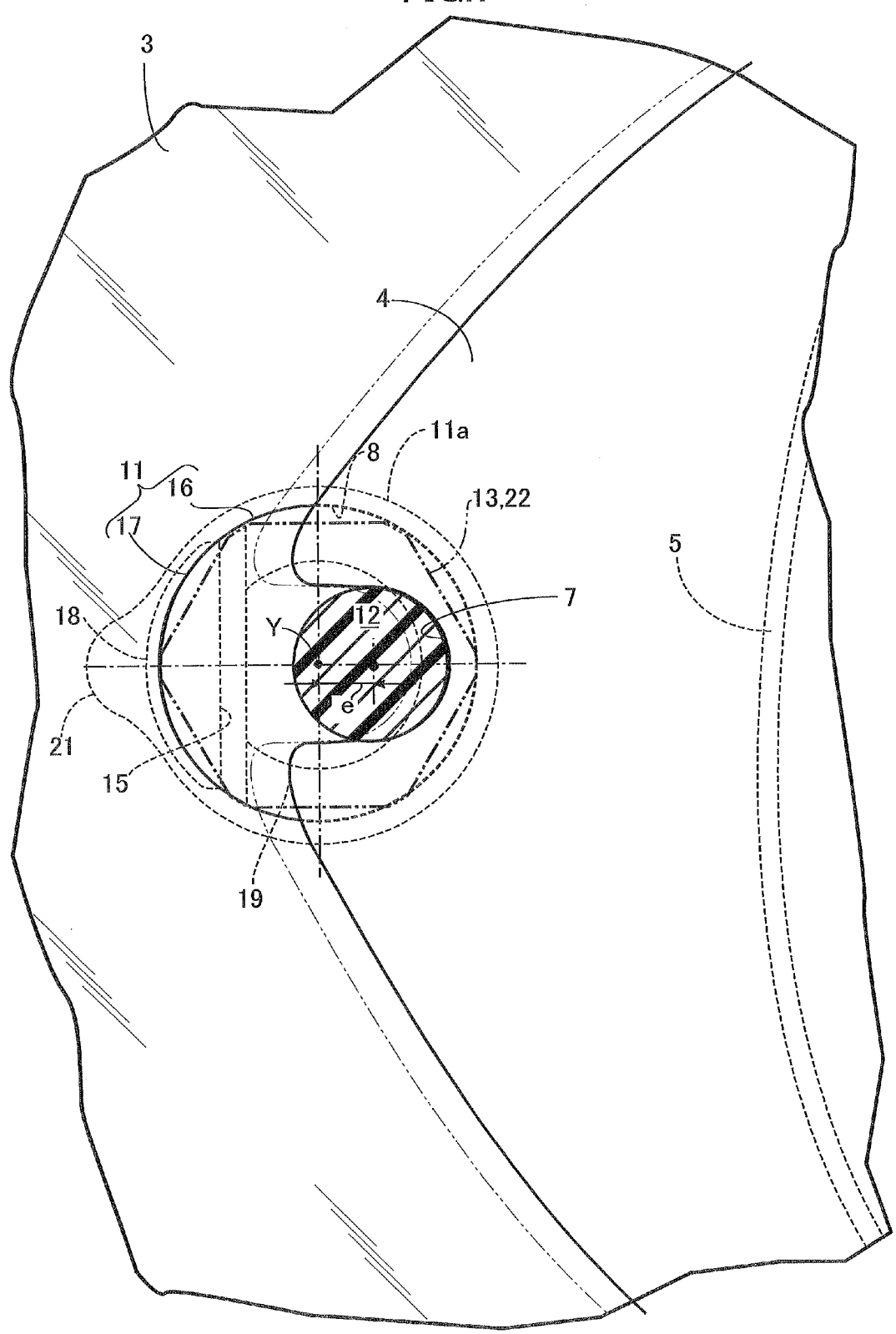
FIG. 7 is a sectional view along line 7-7 in FIG. 6. (first embodiment)

As shown in FIG. 3 to FIG. 5, each retaining member 10 is formed from a single synthetic resin component that includes a main shaft 11, an eccentric shaft 12, and an expanded end part 13, the main shaft 11 having at one end a head portion 11a that abuts against an outer face of the shield 3 and being rotatably fitted into the support hole 8 of the shield 3, the eccentric shaft 12 being connectedly provided integrally with the other end of the main shaft 11 so as to be eccentric relative to its central axis Y by a fixed amount e and opposing the seat part 7 of the anti-fog sheet 4, and the expanded end part 13 being connectedly provided integrally with the outer end of the eccentric shaft 12. The eccentric shaft 12 is formed so as to have a smaller diameter than the main shaft 11, the expanded end part 13 is formed so as to be coaxial with the main shaft 11 and have the same diameter as or a slightly smaller diameter than the main shaft 11, and the expanded end part 13 defines an annular groove 14 around the eccentric shaft 12 in cooperation with the main shaft 11. The expanded end part 13 and eccentric shaft 12 can pass through the support hole 8. Furthermore, the eccentric shaft 12 can rotate through 180° between an unlock position where it is sufficiently spaced from the seat part 7 (see FIG. 4 and FIG. 5) and a lock position where it is seated on the seat part 7 (see FIG. 6 and FIG. 7).

Provided in the main shaft 11 at a position away from the central axis Y is a slit 15 extending through substantially the entire length thereof so as to open in the annular groove 14, this slit 15 dividing the main shaft 11 into a main shaft main portion 16 connected to the eccentric shaft 12 and a crescent cross-section elastic piece 17 having a free end. The elastic piece 17 can undergo elastic deformation so as to narrow or widen the slit 15. Integrally formed with the elastic piece 17 is a latching claw 18 protruding radially outwardly from the outer peripheral edge of the free end part, this latching claw 18 abutting against the inner face of the shield 3 in a state in which the main shaft 11 is fitted into the support hole 8 to thus prevent the main shaft 11 from coming out of the support hole 8. Formed at the outer peripheral edge of the latching claw 18 is an inclined guide face 18a for guiding entry of the latching claw 18 into the support hole 8 when the main shaft 11 is being fitted into the support hole 8.

Furthermore, an axially intermediate part of the main shaft main portion 16 is formed as an elastically deformable small diameter part 19 by forming a peripheral groove 20 on the outer periphery thereof.

Moreover, formed on the head portion 11a of the main shaft 11 is a marker projection 21 indicating the position of the eccentric shaft 12. In the illustrated example, the marker projection 21 is disposed so as to protrude from the outer periphery of the head portion 11a toward the side opposite to the direction of eccentricity of the eccentric shaft 12. A hexagonal tool engagement part 22 is formed on the outer periphery of the expanded end part 13 on the side opposite to the head portion 11a.

The operation of this embodiment is now explained.

When the anti-fog sheet 4 is mounted on the shield 3, the retaining member 10 is first inserted into each support hole 8 from the outer face side of the shield 3 with the expanded end part 13 leading. In this process, when the latching claw 18 of the free end part of the elastic piece 17 of the main shaft 11 comes to the support hole 8, the inclined guide face 18a slips on the open edge of the support hole 8, thus enabling the latching claw 18 to enter the support hole 8 while resiliently tilting the elastic piece 17 toward the slit 15 side. When the main shaft 11 is fitted into the support hole 8 and the head portion 11a abuts against the outer face of the shield 3, the latching claw 18 passes completely through the support hole 8, and the elastic piece 17 is therefore restored from its self deformation to thus make the latching claw 18 engage with the inner face of the shield 3, thereby preventing the retaining member 10 from coming out of the support hole 8. In this way, the retaining member 10 is first mounted in the support hole 8 of the shield 3.

Subsequently, the marker projection 21 of the head portion 11a of the main shaft 11 of each of the left and right retaining members 10 is rotated so as to face the laterally central portion of the shield 3 to thus orient each of the left and right eccentric shafts 12 toward the outside, in the lateral direction, of the shield 3 from the axis Y of the main shaft 11, and the left and right eccentric shafts 12 thus occupy unlock positions where the distance between the two shafts is the maximum. While laterally displacing the anti-fog sheet 4, the laterally opposite end parts are inserted in turn into the annular grooves 14 of the left and right retaining members 10, and the left and right seat parts 7 of the shield 3 are made to oppose the outer peripheral face of the corresponding eccentric shaft 12 (see FIG. 4 and FIG. 5).

Subsequently, in each retaining member 10, engaging a tool 24 such as a box wrench or spanner with the tool engagement part 22 of the expanded end part 13 and rotating the retaining member 10 by means of the tool 24 through substantially 180° (the rotational angle can be confirmed by the position to which the marker projection 21 rotates) allows the eccentric shaft 12, which rotates integrally therewith, to be seated on the seat part 7 and, at the same time, push it, the anti-fog sheet 4, which is originally curved so as to protrude forward, is further curved, and the seal member 5 is thereby put into full intimate contact with the inner face of the shield 3. In such a state, since the line of action of a reactive force of the seat part 7 against the eccentric shaft 12 passes through the central axis Y, or its vicinity, of the eccentric shaft 12, the eccentric shaft 12 attains a locked state, thereby preventing the retaining member 10 from rotating arbitrarily.

In this way, when the anti-fog sheet 4 is mounted on the shield 3 via the pair of retaining members 10 and the endless seal member 5 comes into intimate contact with the inner face of the shield 3, a sealed gap 23 surrounded by the seal member 5 is defined between the shield 3 and the anti-fog sheet 4, and not only is it possible for this to serve as an insulation space to thus reduce the difference in temperature between the inner and outer faces of the shield 3, thereby achieving anti-fogging of the shield 3, but it is also possible to prevent rain drops from becoming attached to opposing faces of the shield 3 and the anti-fog sheet 4 when it is raining, thereby preventing as far as possible any degradation in visibility caused by rain drops.

As described above, since the retaining member 10, which is made of a synthetic resin, is integrally formed as a single component from the head part 11a at one end to the expanded end part 13 at the other end, a structure for mounting an anti-fog sheet having a simple structure and enabling easy mounting can be provided at low cost.

Moreover, if, during handling of the helmet 1, the shield 3 deforms due to contact with another object with an impact, thus causing rapid relative movement between the shield 3 and the anti-fog sheet, and the load caused thereby is applied to the retaining member 10, the above-mentioned load can be absorbed by elastic deformation such as flexure or expansion of the elastic piece 17 having the free end part in the main shaft 11 and the small diameter part 19 of the main shaft main portion 16, thereby preventing the retaining member 10 from being broken. Therefore, the retaining member 10 can reliably retain the anti-fog sheet 4 over a long period of time due to improvement of its durability.

Moreover, the elastic piece 17 can easily be obtained just by forming the slit 15 in the main shaft 11, the small diameter part 19 can easily be obtained just by forming the peripheral groove 20 on the outer periphery of the axially intermediate part of the main shaft main portion 16, it is therefore unnecessary to use an elastic member such as rubber, and the structure can be simplified.

When the anti-fog sheet 4 is detached from the shield 3, the above-mentioned mounting operations may be carried out in reverse.

The present invention is not limited to the above-mentioned embodiment and may be modified in a variety of ways as long as the modifications do not depart from the spirit and scope thereof. For example, instead of the hexagonal tool engagement part 22, a crossed or straight groove for a crosshead or slotted screwdriver to engage therewith may be formed on an end face of the expanded end part 13. Furthermore, the marker projection 21 may be formed in the head portion 11a toward the direction of eccentricity of the eccentric shaft 12. Moreover, the present invention may be applied to the mounting of an anti-fog sheet to a shield for goggles.

The invention claimed is:

1. A structure for mounting an anti-fog sheet to a shield, the structure comprising:
    an anti-fog sheet;
    a shield; and
    a plurality of seat parts that are formed on a peripheral edge part of the anti-fog sheet, wherein the anti-fog sheet covers an inner face of the shield, a plurality of support holes that are provided in the shield at positions corresponding to the plurality of seat parts, and a plurality of retaining members that retain the anti-fog sheet by being seated on the plurality of seat parts while being supported by the plurality of support holes,
    wherein each retaining member of the plurality of retaining members is formed as a single component from a synthetic resin, the single component comprising a main shaft that has at one end a head portion abutting against an outer face of the shield and is rotatably fitted into one of the plurality of support holes, an eccentric shaft that is connectedly provided eccentrically and integrally with a second end of the main shaft, can be seated on a seat part comprised by the plurality of seat parts, and has a smaller diameter than the main shaft has, and an expanded end part that is connectedly provided integrally with an outer end of the eccentric shaft, the outer end of the eccentric shaft being opposite to the integral connection with the second end of the main shaft, the expanded end part defining an annular groove around the eccentric shaft in cooperation with the main shaft, and can pass through said one of the plurality of support holes, and
    wherein the main shaft has a central axis,
    further wherein the main shaft has a slit that extends through substantially an entire length thereof, is parallel to the central axis and opens nearby in the annular groove thereby dividing the main shaft into a main portion and an elastic piece; wherein the main portion joins with the eccentric shaft while the elastic piece has a free end separate from the main portion, and further wherein the elastic piece forms a deformable part of the main shaft so as to absorb a load which comes from both the shield and the anti-fog sheet.

2. The structure for mounting the anti-fog sheet to the shield according to claim 1, wherein
    an axially intermediate part of the main portion is formed as a small diameter part by forming a peripheral groove on an outer periphery of the axially intermediate part.

3. The structure for mounting the anti-fog sheet to the shield according to claim 1, wherein
    the elastic piece of each retaining member having a latching claw formed on the free end, the latching claw abutting against the inner face of the shield when the main shaft is fitted into said one of the plurality of support holes, thereby preventing the main shaft from coming out of said one of the plurality of support holes.

4. The structure for mounting the anti-fog sheet to the shield according to claim 3, wherein
    the latching claw is formed on an outer peripheral edge of the elastic piece with an inclined guide face that slidably engages with an open edge of said one of the plurality support holes when the main shaft is being fitted into said one of the plurality support holes, thereby guiding entry of the latching claw into said one of the plurality support holes while resiliently tilting the elastic piece toward the slit.

5. The structure for mounting the anti-fog sheet to the shield according to claim 1, wherein
    the head portion is provided with a marker showing a position of eccentricity of the eccentric shaft relative to the main shaft, and the expanded end part has a tool engagement part formed thereon.

6. The structure for mounting the anti-fog sheet to the shield according to claim 1, wherein
    the anti-fog sheet has a seal member attached to an outer face thereof, the seal member extending continuously along a peripheral edge of the outer face of the anti-fog sheet and being in intimate contact with the inner face of the shield, and a sealed gap surrounded by the seal member being defined between the shield and the anti-fog sheet.

* * * * *